(12) United States Patent
Van Acht (10) Patent No.: US 12,457,429 B2
(45) Date of Patent: Oct. 28, 2025

(54) IMAGE SENSING SYSTEM (71) Applicant: KONINKLIJKE PHILIPS N.V., Eindhoven (NL)

(72) Inventor: Victor Martinus Gerardus Van Acht, Veldhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 94 days.

(21) Appl. No.: 18/292,506

(22) PCT Filed: Jul. 20, 2022

(86) PCT No.: PCT/EP2022/070336
§ 371 (c)(1),
(2) Date: Jan. 26, 2024

(87) PCT Pub. No.: WO2023/006542
PCT Pub. Date: Feb. 2, 2023

(65) Prior Publication Data
US 2024/0334075 A1  Oct. 3, 2024

(30) Foreign Application Priority Data
Jul. 29, 2021 (EP) ..................... 21188443

(51) Int. Cl.
H04N 25/40 (2023.01)
H04N 23/74 (2023.01)
(Continued)

(52) U.S. Cl.
CPC ............. *H04N 25/41* (2023.01); *H04N 23/74* (2023.01); *H04N 25/10* (2023.01); *H04N 25/531* (2023.01)

(58) Field of Classification Search
CPC ........ H04N 25/41; H04N 23/74; H04N 25/10; H04N 25/531; H04N 23/125; H04N 23/13
See application file for complete search history.

(56) References Cited

U.S. PATENT DOCUMENTS 7,926,945 B2   4/2011  Dick et al.
8,681,126 B2   3/2014  Keam
(Continued)

FOREIGN PATENT DOCUMENTS

WO  2021038692 A1  3/2021
WO  2022033987 A1  2/2022
WO  2022128702 A1  6/2022

OTHER PUBLICATIONS

Wilburn, High Performance Imaging Using Arrays of Inexpensive Cameras, a Dissertation Submitted to the Department of Electrical Engineering and the Committee on Graduate Studies of Stanford University in Partial Fulfillment of the Requirements for the Degree of Doctor of Philosophy, Dec. 2004, pp. 1-128.
(Continued)

*Primary Examiner* — Chiawei Chen (57) ABSTRACT

According to an aspect, there is provided an image sensing system comprising: at least two rolling shutter image sensors, each rolling shutter image sensor comprising an array of pixels in a frame arranged in a plurality of image lines extending along a width direction, and distributed in a scanning direction which is perpendicular to the width direction, wherein each rolling shutter image sensor is configured to scan its frame by sequentially scanning each image line along the scanning direction, wherein scanning each image line includes making the pixels in each image line sensitive to light for a predetermined exposure time, and then determining an intensity readout for each pixel of the respective image line; a controller configured to temporally (Continued)

stagger scanning of frames for each rolling shutter image sensor, such that the controller is configured to start scanning of frames from a first image line in the scanning direction, for each rolling shutter image sensor with a time delay with respect to the other rolling shutter image sensors; a lens system configured to project similar outgoing images of an object onto each rolling shutter image sensor, wherein the outgoing images are projected onto each rolling shutter image sensor such that each pixel of an outgoing image corresponding to a position on the object matches a pixel or group of pixels of another outgoing image corresponding to the respective position on the object, and such that the outgoing images are captured by each rolling shutter image sensor with differing colours of light, defined by different wavelengths; and a processor configured to identify matched pixels of different outgoing images corresponding to a respective position on the object, and to resolve the colour of the object based on the intensity readout of each matched pixel and the colours of light that the respective matched pixels were exposed to while they were sensitive.

15 Claims, 6 Drawing Sheets

(51) Int. Cl.
*H04N 25/10* (2023.01)
*H04N 25/531* (2023.01)

(56) References Cited

U.S. PATENT DOCUMENTS

| | | | |
|---|---|---|---|
| 9,398,196 B2* | 7/2016 | Aldridge | H04N 23/80 |
| 9,736,459 B2 | 8/2017 | Mor et al. | |
| 9,871,586 B2* | 1/2018 | De Bruijn | H04N 23/00 |
| 10,628,983 B2 | 4/2020 | Barger et al. | |
| 10,728,529 B2* | 7/2020 | Ravirala | H04N 23/689 |
| 12,041,360 B2* | 7/2024 | Venkataraman | H04N 13/128 |
| 12,126,918 B2* | 10/2024 | Bourquin | H04N 23/45 |
| 2007/0147511 A1 | 6/2007 | Ogawa et al. | |
| 2007/0147811 A1* | 6/2007 | Nakao | H04N 13/254 |
| | | | 348/78 |
| 2007/0257184 A1 | 11/2007 | Olsen et al. | |
| 2010/0225783 A1 | 9/2010 | Wagner | |
| 2020/0322552 A1 | 10/2020 | Daures et al. | |
| 2023/0353889 A1* | 11/2023 | Bourquin | H04N 23/74 |

OTHER PUBLICATIONS

International Search report and Written Opinion of PCT/EP2022/070336, dated Nov. 14, 2022.

* cited by examiner

IMAGE SENSING SYSTEM

CROSS-REFERENCE TO PRIOR APPLICATIONS

This application is the U.S. National Phase application under 35 U.S.C. § 371 of International Application No. PCT/EP2022/070336, filed on Jul. 20, 2022, which claims the benefit of European Patent Application No. 21188443.2, filed on Jul. 29, 2021. These applications are hereby incorporated by reference herein.

FIELD OF THE INVENTION

The invention relates to an image sensing system for resolving the colour of an object, and a method for resolving the colour of an object.

BACKGROUND OF THE INVENTION

Multispectral imaging involves making an image with more spectral resolution (i.e. colours) than the three colours that the human eye can distinguish (red, green, and blue). Generally, making an image with colour involves the use of image sensor which can sense more than one colour. However, colour sensors are more expensive than black and white image sensors, and sensors which can sense more than 3 colours are yet more expensive and difficult to make.

US 2020/322552 discloses a method allowing the use of the information accessible by fluorescence imaging to be optimized. For this purpose, it implements the combination of a protocol for calibration and synchronization of a pulsed light for exciting a fluorescent marker, with the operation in rolling shutter mode of a fluorescence camera. An appropriate correction factor allows the complete signal integrated by all of the photodiodes of the camera to be used so that no image is lost.

SUMMARY OF THE INVENTION

According to a first specific aspect, there is provided an image sensing system comprising: at least two rolling shutter image sensors, each rolling shutter image sensor comprising an array of pixels in a frame arranged in a plurality of image lines extending along a width direction, and distributed in a scanning direction which is perpendicular to the width direction, wherein each rolling shutter image sensor is configured to scan its frame by sequentially scanning each image line along the scanning direction, wherein scanning each image line includes making the pixels in each image line sensitive to light for a predetermined exposure time, and then determining an intensity readout for each pixel of the respective image line; a controller configured to temporally stagger scanning of frames for each rolling shutter image sensor, such that the controller is configured to start scanning of frames from a first image line in the scanning direction, for each rolling shutter image sensor with a time delay with respect to the other rolling shutter image sensors; a lens system configured to project similar outgoing images of an object onto each rolling shutter image sensor, wherein the outgoing images are projected onto each rolling shutter image sensor such that each pixel of an outgoing image corresponding to a position on the object matches a pixel or group of pixels of another outgoing image corresponding to the respective position on the object, and such that the outgoing images are captured by each rolling shutter image sensor with differing colours of light, defined by different wavelengths; and a processor configured to identify matched pixels of different outgoing images corresponding to a respective position on the object, and to resolve the colour of the object based on the intensity readout of each matched pixel and the colours of light that the respective matched pixels were exposed to while they were sensitive.

The lens system may comprise a prism to split incoming light into two or more different colours of light, defined by different wavelengths, so as to project each outgoing image in a single colour, which differs from the colours of the other outgoing images, such that each rolling shutter image sensor captures an outgoing image with a different colour of light.

The image sensing system may comprise a light generator configured to generate at least two different colours of light, defined by different wavelengths, to illuminate the object. The image sensing system may comprise a timing module configured to control the light generator to sequentially generate the at least two different colours of light during scanning of each frame for each rolling shutter image sensor, so that each outgoing image is captured by each rolling shutter image sensor having two or more different colours.

Each image line of an outgoing image on each rolling shutter image sensor may match an image line of another outgoing image of another rolling shutter image sensor corresponding to a position on the object. The processor may be configured to identify matched image lines, and resolve the colour of the respective position of the object based on the intensity readout of each pixel in the matched image lines and the colours of light that the respective pixels were exposed to while they were sensitive.

The matched pixels or the matched image lines may be predetermined based on the configuration of the rolling shutter image sensors and the lens system.

In its simplest form, requiring the least amount of processing, each rolling shutter image sensor may comprise the same number of image lines, and each image line on each image sensor may match the corresponding image line in the same position in the scanning direction on a different image sensor.

A frequency of switching between light colours during scanning of a single frame may be equal to, or a multiple of, the number of image sensors. The frequency of switching between light colours during scanning of a single frame may be equal to or more than the number of image sensors.

The number of colours of light which the light generator is configured to generate may be equal to, or a multiple of, the number of rolling shutter images sensors.

The time delay between starting scanning of frames for each rolling shutter image sensor may be equal to the time taken to scan a single frame divided by the number of rolling shutter image sensors.

The lens system may comprise an optical beam splitter to project identical outgoing images to the at least two different rolling shutter image sensors.

According to a second aspect, there is provided a method of resolving the colour of an object with at least two rolling shutter image sensors, each rolling shutter image sensor comprising an array of pixels in a frame arranged into a plurality of image lines extending along a width direction, and distributed in a scanning direction which is perpendicular to the width direction, wherein each rolling shutter image sensor is configured to scan its frame by sequentially scanning each image line along the scanning direction, wherein scanning each image line includes making the pixels in each image line sensitive to light for a predetermined exposure time, and then determining an intensity readout for each pixel of the respective image line, the method comprising: scanning frames of each rolling shutter image sensor in a staggered manner such that a start of scanning a frame for each rolling shutter image sensor is scanned with a time delay with respect to another rolling shutter image sensor; projecting similar outgoing images onto each rolling shutter image sensor, wherein each pixel of an outgoing image corresponding to a position on the object matches a pixel or a group of pixels of another outgoing image corresponding to the respective position on the object, and such that the outgoing images are captured by each rolling shutter image sensor with differing colours of light, defined by different wavelengths; identifying matched pixels of different outgoing images corresponding to a respective position on the object, and resolving the colour of the respective position of the object based on the intensity readout of each matched pixel in the outgoing image and the colours of light that the respective matched pixels were exposed to while they were sensitive.

The method may comprise splitting incoming light into two or more different colours of light defined by different wavelengths, so as to project each outgoing image in a single colour, which differs in colour from the other outgoing images, such that each rolling shutter image sensor captures an outgoing image with a different colour of light.

The method may comprise sequentially generating at least two different colours of light, defined by different wavelengths, to illuminate the object during scanning of each frame of the rolling shutter image sensors so that each outgoing image is captured by each rolling shutter image sensor having two or more different colours. The time delay may be smaller than the time taken to scan a single frame.

Each image line of an outgoing image on each rolling shutter image sensor may match an image line of another outgoing image of another rolling shutter image sensor corresponding to a position on the object. The method may comprise identifying matched image lines and resolving the colour of the respective position of the object based on the intensity readout of each pixel in the matched image lines and the colours of light that the respective pixels were exposed to while they were sensitive.

Matched image lines may be predetermined based on the configuration of the rolling shutter image sensors and the projection of the outgoing images.

The at least two different colours of light may be sequentially generated with a frequency equal to, or a multiple of, the number of image sensors during scanning of a single frame. The frequency of switching between light colours during scanning of a single frame may be equal to or more than the number of image sensors.

The number of colours of light which are generated may be equal to, or a multiple of, the number of rolling shutter images sensors.

The time delay between starting scanning of frames for each rolling shutter image sensor may be equal to the time taken to scan a single frame divided by the number of rolling shutter image sensors.

These and other aspects will be apparent from and elucidated with reference to the embodiment(s) described hereinafter.

BRIEF DESCRIPTION OF THE DRAWINGS

Exemplary embodiments will now be described, by way of example only, with reference to the following drawings, in which.

DETAILED DESCRIPTION OF THE EMBODIMENTS

Figure 1:
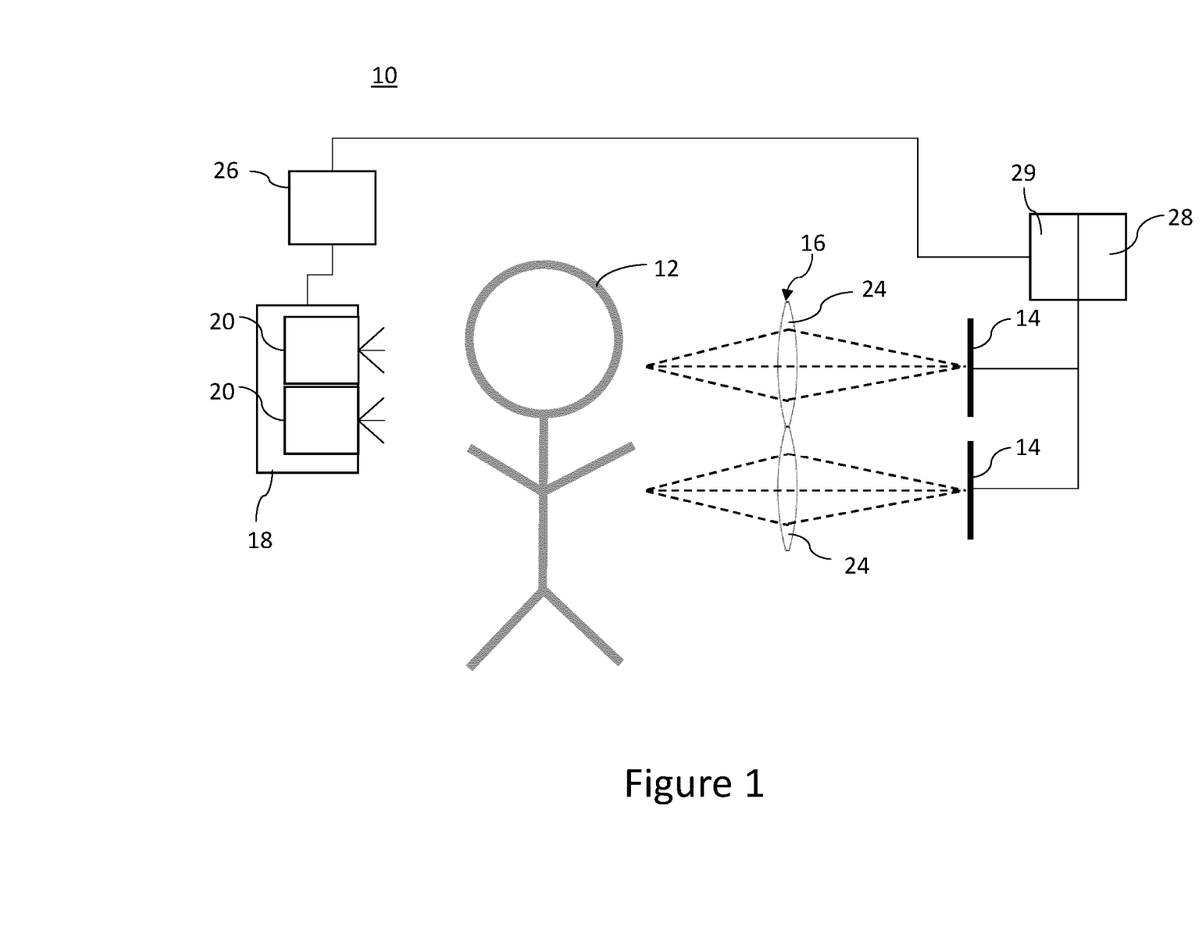
FIG. 1 schematically shows a first example image sensing system.

FIG. 1 shows an image sensing system 10 in use to sense an image of an object 12 and to determine the colour of the object 12. The image sensing system 10 comprises two rolling shutter image sensors 14 and a lens system 16 configured to project similar outgoing images of the object 12 onto each image sensor 14. Therefore, in this example, the lens system 16 is configured to project two similar outgoing images of the object 12. In some examples, there may be more than two rolling shutter image sensors, and the lens system may be configured to project more than two similar outgoing images of the object onto the image sensors such that at least one outgoing image is projected onto each image sensor.

The lens system 16 in this example comprises two lenses 24 which are disposed adjacent one another, in front of each image sensor 14. The lens system 16 is therefore arranged to be disposed between the object 12 to be imaged and each of image sensors 14.

In other examples, the lens system may comprise a lens and one or more beam splitters, with the beam splitters disposed between the lens and the images sensor, or with a lens disposed between the beam splitter and each image sensor, such that the beam splitters are configured to split beams from the lens to project two or more identical images onto the image sensors.

The image sensing system 10 comprises a light generator 18 which, in this example, is configured to generate two different colours of light to illuminate the object 12. In this example, the light generator 18 comprises two lights 20, green (G) and red (R), which are configured to generate flashes of light at different wavelengths (i.e. the different colours of light). In other examples, the light generator may be configured to generate three different colours of light with three lights, or more than three different colours of light with more than three lights. In further examples, the lights may be configured to generate continuous light, back to back, as opposed to flashes. It will be appreciated that generating different colours of light can also be achieved with only one light, together with a plurality of different colour filters. In some examples, the colours of light may be different colours to green and red.

The image sensing system 10 comprises a timing module 26 which is configured to control the light generator 18 to generate the different colours of light at suitable intervals, in other words to control the different lights 20 of the light generator 18 to flash at the correct time, which is explained in more detail below with reference to FIG. 2, below.

The image sensing system 10 further comprises a controller 29 which is configured to control timing of scanning of the image sensors 14, which will also be explained in more detail with reference to FIG. 2, below.

Figure 2:
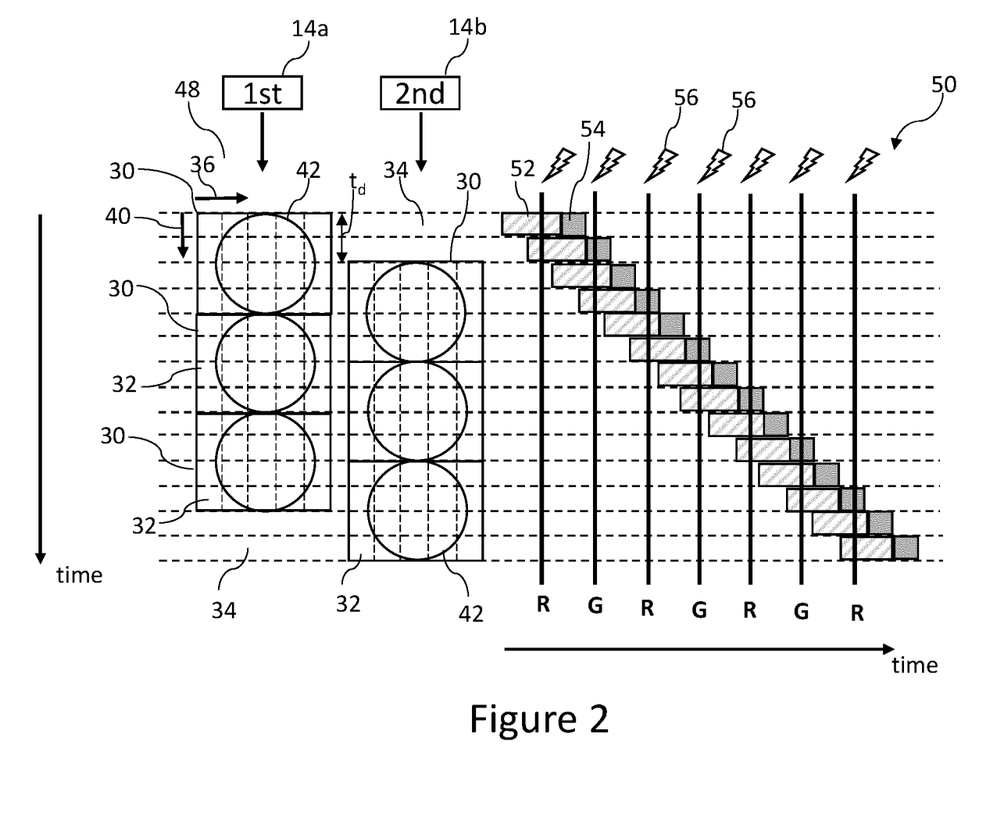
FIG. 2 schematically shows an example capture time map of outgoing images captured by the image sensing system of FIG. 1, together with an example scanning time map.

FIG. 2 shows a plurality of frames 30 having sequentially captured outgoing images 42 with the two rolling shutter image sensors 14 (a first rolling shutter image sensor 14a and a second rolling shutter image sensor 14b) in a capture time map 48, where the two image sensors 14 have the same frame rate.

Each rolling shutter image sensor 14 comprises an array of pixels 32 in the frame 30 arranged into image lines 34 extending along a width direction 36, and distributed in a scanning direction 40 which is perpendicular to the width direction 36. In this example, each image sensor 14 comprises only four image lines 34 for simplicity. It will be appreciated that an image sensor may comprise any suitable number of image lines.

Each rolling shutter image sensor 14 is configured to scan the whole frame 30 of pixels 32 by scanning each image line 34 sequentially along the scanning direction 40. In other words, it is configured to scan an image line 34, followed by the adjacent image line 34 in the scanning direction 40.

Scanning of each image line 34 includes scanning each pixel 32 in the image line 34 sequentially along the width direction 36. In other words, the image sensor 14 scans a pixel 32 in an image line 34 followed by an adjacent pixel in the image line 34 in the width direction 36. Scanning each image line 34 includes making the pixels 32 in the respective image line 34 sensitive to light for a predetermined exposure time, and then reading out an intensity readout for each pixel 32.

FIG. 2 shows a plurality of frames 30 of the first image sensor 14a and the second image sensor 14b sequentially captured, with a time delay td between the scanning of the frames 30 from the first image sensor 14a compared to scanning of the frame 30 from the second image sensor 14b. The time delay td is controlled by the controller 29 of the image sensing system 10. In other words, the controller 29 is configured to temporally stagger scanning of frames 30 for each image sensor 14 so as to start scanning of a frame 30 for each image sensor 14 from a first image line 34 in the scanning direction 40 with a time delay, td, with respect to the other image sensors 14 (shown in FIG. 2). In this example, the time delay, td, is the same between all frames 30 captured by the first image sensor 14a compared to the frames 30 captured by the second image sensor 14b, and is equal to half of the time taken to scan a whole frame 30. In other examples, the time delay may be more than half the time taken to scan a whole frame up to the time taken to scan a whole frame, or may be less than half the time taken to scan a whole frame. The time delay to start scanning may not be equal between different image sensors.

Next to the image sensor 14, a scanning time map 50 is shown. The scanning time map 50 shows the passage of time from left to right. For each image line 34, the scanning time map 50 shows an exposure time 52 followed by an intensity readout 54. In other words, once the image line 34 has been sensitive to light for the predetermined exposure time 52, the image sensor 14 is configured to readout the pixels 32 in the image line 34. Reading out the pixels 32 comprises determining an intensity for each pixel 32 of the respective image line 34, corresponding to the intensity of light received at the respective pixel 32 during the exposure time 52.

The beginning of the exposure time 52 for each image line 34 in the scanning direction 40 is offset a predetermined amount of time from the preceding image line 34, corresponding to the amount of time it takes to readout 54 an image line 34. Therefore, while each image line 34 is sensitive to light for the same amount of time, the sensitivity to light begins for each image line 34 at a different time.

The timing module 26 of the image sensing system 10 is configured to control the light generator 18 to sequentially generate the two different colours of light during scanning of each frame 30 of each image sensor 14, such that each frame 30 of each image sensor 14 captures an outgoing image 42 which has been illuminated by to two different colours of light while the pixels 32 of the respective image sensor 14 are sensitive to light. In other words, each outgoing image 42 captured by each image sensor 14 has at least two differing colours of light (best seen in FIG. 3).

In this example, flashes of light 56 from the light generator 18 are controlled to illuminate the object 12 at intervals, with flashes of light 56 alternating between green (G) and red (R), and are timed so that at least one green flash 56 and at least one red flash 56 illuminate the object 12 during scanning of each and every frame 30 for each image sensor 14. In this example, each flash of light 56 is generated to illuminate the object 12 when half of the image lines 34 of a single frame 30 are sensitive. Therefore, there are two flashes of light during scanning of each frame 30. In the simplified example shown in FIG. 2, this means that when only the first two image lines 34 of the first frame 30 of the first image sensor 14a are sensitive, a red (R) flash of light 56 is generated, then when only the first two image lines 34 of the first frame 30 of the second image sensor 14b are sensitive, and the third and fourth image lines 34 of the first image sensor 14a are sensitive, a green (G) flash of light 56 is generated to illuminate the object. This is repeated for each frame 30.

Figure 3:
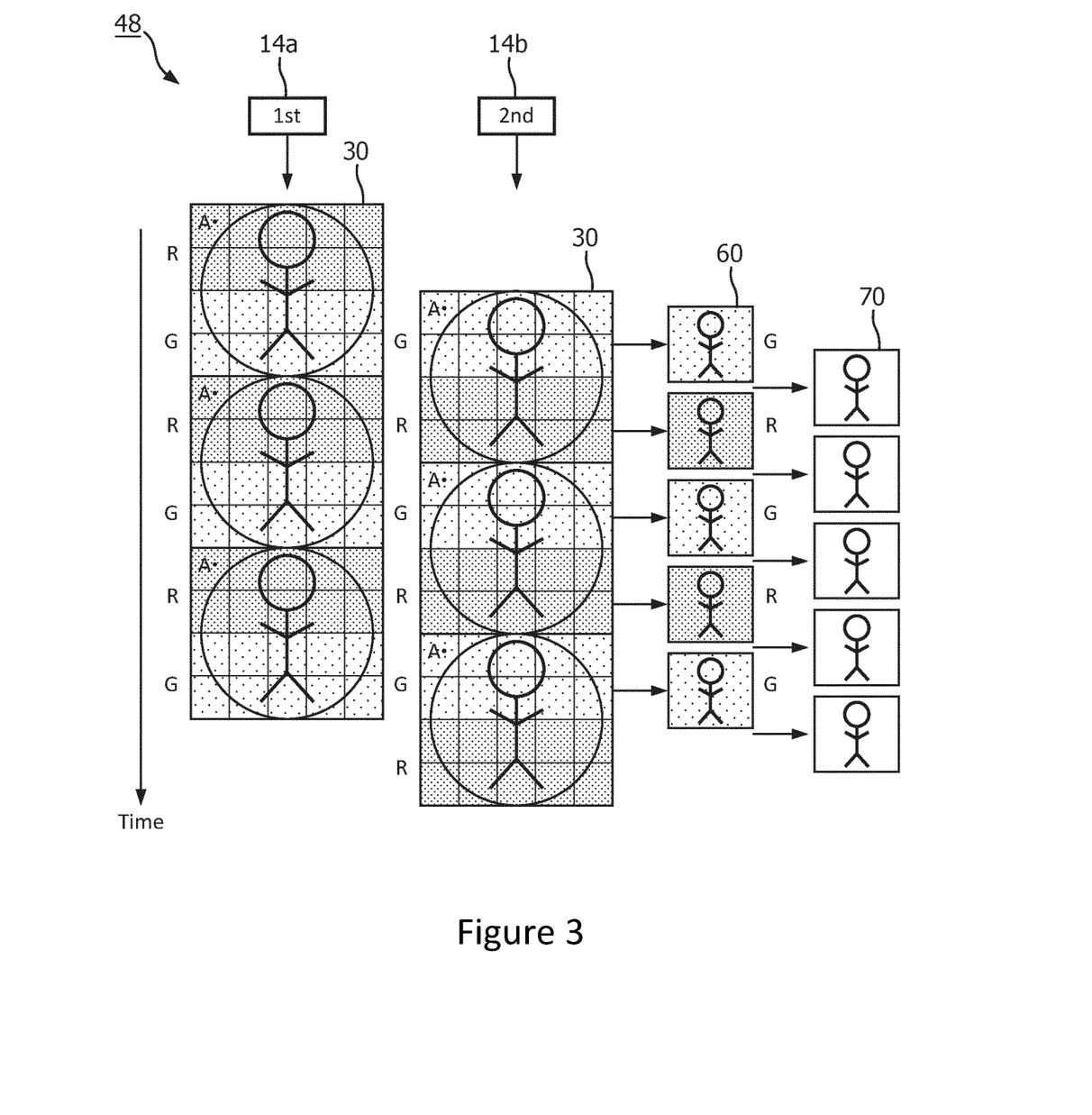
FIG. 3 schematically shows the capture time map of FIG. 2 in more detail.

Example outgoing images 42 captured as a result of the alternating colours of light flashed in intervals are shown in FIG. 3.

In FIG. 3, the plurality of outgoing images 42 are shown in the capture time map 48 with the colours of light (G) and (R) that illuminated the object 12 during sensitivity of the image lines 34. It can be seen that the bottom half of the outgoing image 42 in the first frame 30 of the first image sensor 14a, and the top half of the outgoing image 42 in the first frame 30 of the second image sensor 14b are both illuminated green at the same time. Therefore, by combining the top half of the outgoing image 42 from the second image sensor 14b with the bottom half of the outgoing image 42 from the first image sensor 14a, a spliced image 60 from the outgoing images 42 showing the whole object 12 illuminated with green light can be created, in the time taken to readout half a frame 30. This can be repeated for the top half of the second frame 30 from the first image sensor 14a, and the bottom half of the first frame 30 of the second image sensor 14b, which are both illuminated with red light (R) at the same time, and can therefore create a spliced image 60 of the whole object 12 illuminated with red light (R) in the time taken to readout half a frame 30. This can be repeated for every half frame 30 which is read out from both images sensors 14 to produce a plurality of spliced images 60, derived from the outgoing images 42, which capture the object 12 illuminated by a single colour of light.

Referring back to FIG. 1, the image sensing system 10 further comprises a processor 28 which is configured to identify matched pixels 32 of different outgoing images 42 which each correspond to the same position on the object 12. For example, pixel A, shown in FIG. 3 as the first pixel 32 in the scanning direction and in the width direction for each frame 30, corresponds to the same position on the object 12 for each frame 30, such that pixel A on each frame 30 is matched to pixel A on another frame 30.

In this example, since the outgoing images 42 in this example are projected in identical size on each image sensor 14, and each image sensor 14 comprises the same number of image lines 34, and assuming that the object 12 being imaged does not move fast, each pixel 32 of one outgoing image 42, corresponding to a position on the object 12, matches a pixel 32 at the same position in the image sensor 14 of another outgoing image 42 corresponding to the same position on the object 12. Further, an entire image line 34 of one outgoing image 42, corresponding to a position on an object 12, matches an entire image line 34 on another outgoing image 42, corresponding to the same position on the object 12.

It will be appreciated that the outgoing images need not be of identical size, and that pixels of one outgoing image, corresponding to a position on the object, may match a group of pixels of another outgoing image, corresponding to the same position on the object.

The matched image lines 34 and pixels 32 are predetermined due to the configuration of the lens system 16 and the image sensors 14, therefore requiring very little processing power to identify the matched image lines 34 or the matched pixels 32. If an image sensing system is likely to be capturing an object which is moving fast, then more processing may be required by the processor to identify parts of each outgoing image which are similar and therefore likely to correspond to the same position on the object.

In other examples, if the projected outgoing images are not of the same size, whole image lines may not be matched, but matched pixels may still be predetermined based on the configuration of the lens system and the images sensors.

The processor 28 is configured to resolve the colour of each matched pixel based on the intensity readout of the matched pixels A which are illuminated by the green light and the red light. For example, by superimposing a green spliced image 60 with a red spliced image 60, an output image 70 can be created with the colour of the object 12 at each pixel resolved, even if the image sensor 14 used is a monochrome image sensor. In other words, the processor 28 is configured to resolve the colour of the object 12 based on the intensity readout of each matched pixel 32 and the colours of light that the respective matched pixels 32 were exposed to while they were sensitive. The resolved colour will have a spectral resolution including the wavelengths of the two colours of light generated by the light generator 18 during scanning of each frame 30.

It will be appreciated that the intermediate step of forming the spliced images 60 is not required to resolve the colour since the spliced images 60 are derived directly from the outgoing images 42. Rather, the colour can be resolved merely by identifying the matched pixels 32 from the outgoing images 42 and the colour of light that they were exposed to, and superimposing the different colours and their intensities.

Due to the multiple image sensors 14, and the staggered scanning of each image sensor, the effective frame rate of output images 70 (i.e. images with resolved colour) is increased. In this example, the effective frame rate is doubled, but in other examples, where there are more image sensors, the effective frame rate may be increased yet further by a multiple of the number of image sensors.

Although it has been described that there are two flashes of light 56 generated during scanning of a single frame 30, in other examples, the timing module may control the light generator 18 to generate flashes of light at a different frequency, such as more than two flashes during scanning of each frame. Having the flashes of light 56 generated alternately at a frequency which is equal to, or a multiple of the number of image sensors, during scanning of a single frame reduces the processing required to resolve the colour, since the matched image lines will always be the same between temporally adjacent frames.

In some examples, where there are more than two image sensors, there may be more lights configured to generate different colours of light. In an example where there are three image sensors, there may be three or more lights to generate three or more different colours of light. When the number of colours of light is equal to, or a multiple of, the number of image sensors, the processing required to resolve the colour is reduced.

Although it has been described that the time delay in this example between the start of scanning of different roll is equal to half of the time taken to scan a whole frame, in other examples, the time delay may be any suitable time delay. When the time delay is equal to the time taken to scan a single frame, divided by the number of image sensors, as in this example, the processing required to resolve the colour is reduced. Further, if the number of image lines scanned within the period of the time delay is equal to the number of image lines which are exposed to a single flash of light, this further reduces the processing required to resolve the colour since the same image lines will always be matched between frames with different colours, such that identifying the matched image lines to be superimposed is always the same between adjacent frames captured by the image sensors.

Figure 4:
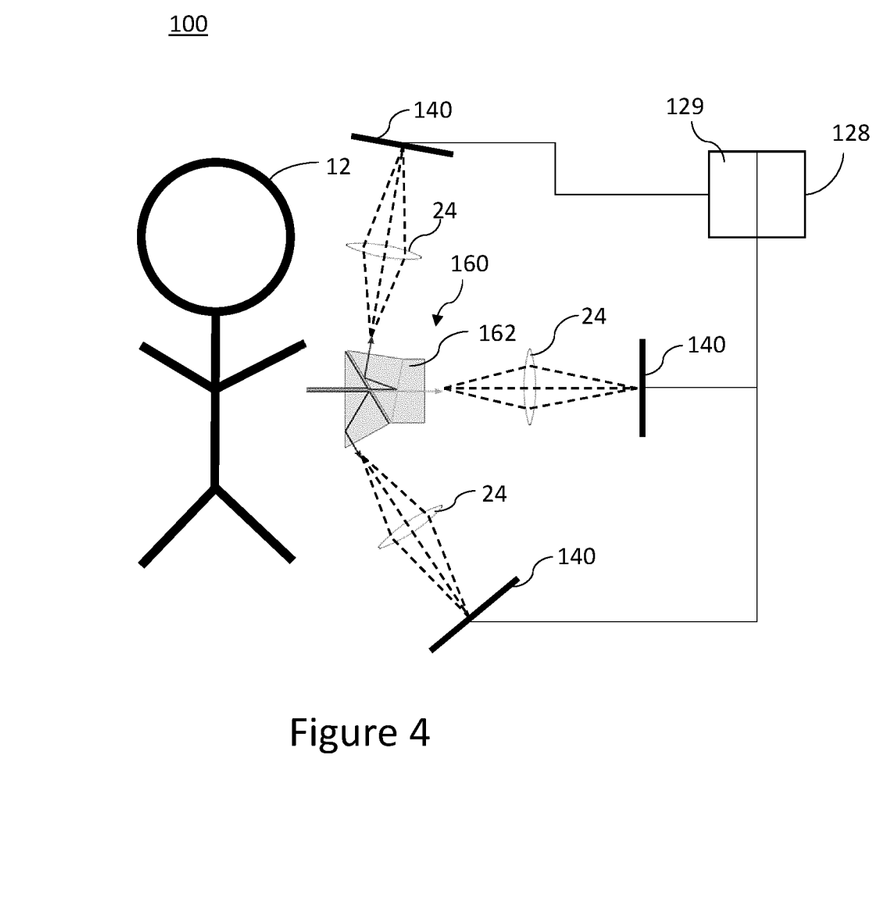
FIG. 4 schematically shows a second example image sensing system.

FIG. 4 shows a second example image sensing system 100 in use to sense an image of an object 12 and to determine the colour of the object 12. The second example image sensing system 100 comprises three rolling shutter image sensors 140 similar to the rolling shutter image sensors 14 in the first example image sensing system 10.

The image sensing system 10 comprises a lens system 160 configured to project similar outgoing images of the object 12 onto each image sensor 140. Therefore, in this example, the lens system 160 is configured to project three similar outgoing images of the object 12. In some examples, there may be only two rolling shutter image sensors or more than three image sensors, and the lens system may be configured to project two, or more than three similar outgoing images of the object onto the image sensors.

The lens system 160 in this example comprises a trichroic prism 162 configured to split incoming light from the object 12 into three different colours of light, defined by different wavelengths, which in this example, are green (G), blue (B), and red (R). Each image sensor 140 is positioned to capture an outgoing image 142 (shown in FIG. 5) with a different colour of light with a lens 24 disposed between the prism 162 and each image sensor 140. In other examples, there may be only a single lens disposed between the object and the prism. Each image sensor 140 may therefore be a black and white image sensor, since it is known which colour of light each image sensor 140 is receiving, and therefore the intensity of light received corresponds to the intensity of that colour.

The second example image sensing system 100 comprises a processor 128 which is configured to identify matched pixels of different outgoing images 142 corresponding to a respective position on the object 12, and to resolve the colour of the object based on the intensity readout of each matched pixel and the colours of light that the respective matched pixels were exposed to while they were sensitive.

The second example image sensing system 100 comprises a controller 129 which is configured to control timing of scanning of the image sensors 140 in a similar manner to the first example image sensing system 10, shown in the capture time map 48 in FIG. 2. In other words, the controller 129 controls the scanning of each image sensor 140 such that there is a time delay, td, between the scanning of the frames 130 for each image sensor 140.

Although it has been described that the lens system comprises a trichroic prism to split the incoming light into three outgoing images of different colours, in some examples, the prism may split the light into any suitable number of different colours, corresponding to the number of images sensors.

Figure 5:
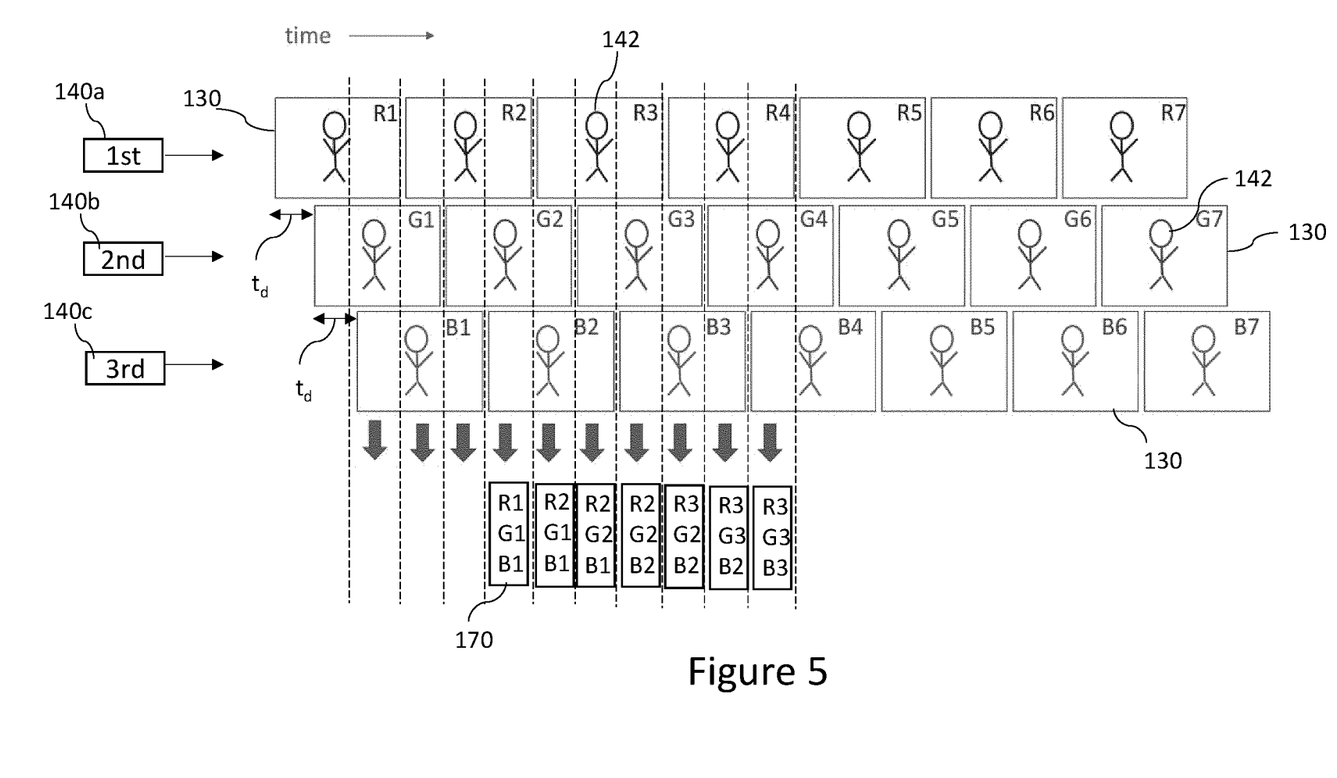
FIG. 5 schematically shows a plurality of images captured with the image sensing system of FIG. 4, and processing thereof.

FIG. 5 shows a plurality of frames 130 which are captured by a first image sensor 140a, a second image sensor 140b, and a third image sensor 140c. In this example, the time delay, td, between starting scanning of one image sensor 140 and starting scanning of another image sensor 140 is equal to one third of the time taken to scan a whole frame 130. In other examples, the time delay may be more than one third the time taken to scan a whole frame up to the time taken to scan a whole frame, or may be less than one third of the time taken to scan a whole frame. The time delay to start scanning may not be equal between different image sensors.

When the time delay in the first and second example image sensing systems 10, 100 is constant between images sensors and equal to the time taken to scan a single frame, divided by the number of image sensors, the constant effective increased frame rate is maximised.

Due to the configuration of the lens system 160, each image sensor 140 captures an outgoing image 142 in a single colour, but the colour is different for each image sensor 140.

An output image 170 can be derived from the outgoing images 142 after completion of scanning of any single outgoing image 142 (except for the first two images of the sequence, or the first n−1 images of the sequence, where n is the number of image sensors). For example, after the first frame 130 from each image sensor 140, R1, G1, B1 is captured, an output image 170 can be created by the processor 128 by resolving the colour of each matched pixel in the frames R1, G1 and B1. As in the first example image sensing system 10, pixels or entire image lines may be matched based on the configuration of the lens system and the image sensors. When the next frame R2 is completed after the time taken to scan one third of a frame 130, the next output image 170 can be created based on R2, G1, and B1. Each output image 170 can then be derived from the most recently completed outgoing image 142 from each image sensor 140 (i.e., the most recently completed outgoing image 142 of each colour), such that a new output image is created at three times the frame rate of each image sensor 140. Therefore, due to the staggered scanning of the multiple image sensors 140, the effective frame rate of the image sensing system 100 can be increased for resolved colour images (i.e. output images 170).

Figure 6:
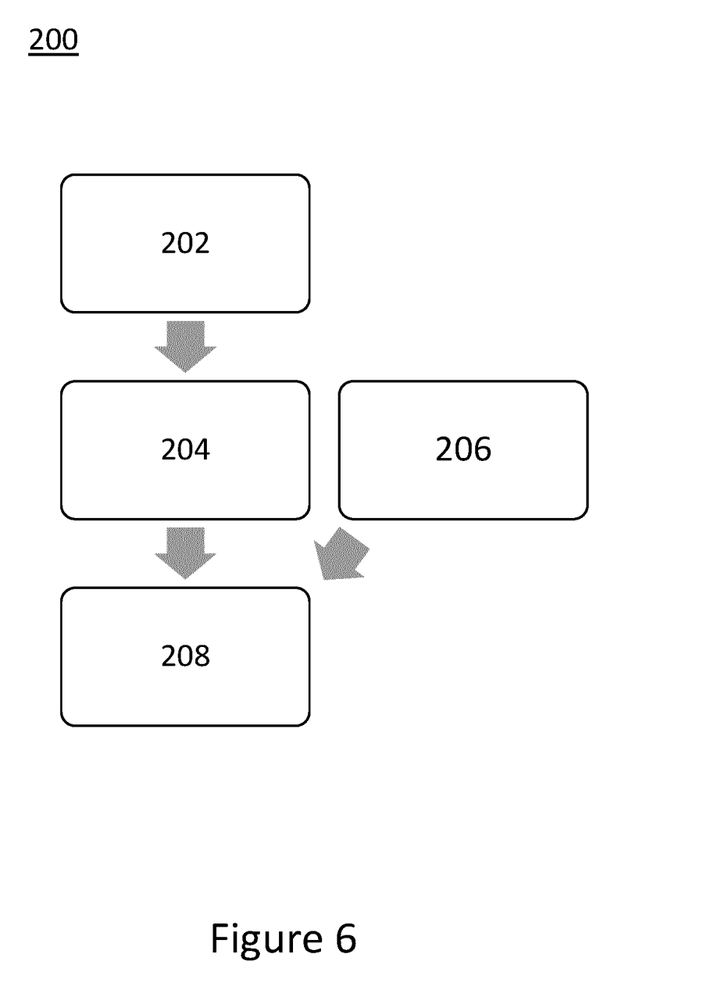
FIG. 6 is a flow chart showing steps of a method for resolving colour of an object.

FIG. 6 is a flow chart showing steps of a method 200 of resolving colour of an object with at least two rolling shutter image sensors 14, 140 such as shown in the first example image sensing system 10 or the second example image sensing system 100.

Block 202 of the method 200 comprises scanning frames 30, 130 of each rolling shutter image sensor 14, 140 in a staggered manner such that a start of scanning a frame 30, 130 for each image sensor 14, 140 is scanned with a time delay, td, with respect to another image sensor 14, 140.

Block 204 of the method 200 comprises projecting similar outgoing images 42, 142, onto each image sensor 14, 140, where each pixel 32 of an outgoing image 42, 142 corresponding to a position on the object 12 matches a pixel 32 or a group of pixels 32 of another outgoing image 42, 142 corresponding to the respective position on the object 12, such that the outgoing images 42, 142 are captured by each rolling shutter image sensor 14, 140 with differing colours of light, defined by different wavelengths. In other words, each individual outgoing image may be captured with multiple colours of light, or each individual outgoing image may be captured with a single colour of light, but where each outgoing image is captured with a different colour of light.

Block 206 of the method comprises sequentially generating different colours of light to illuminate the object during scanning of each frame of the rolling shutter image sensors so that each outgoing image is captured by each rolling shutter image sensor having two or more different colours. For example, with the first example image sensing system 10, which creates outgoing images 42 which each capture two or more colours of light in different parts of the respective outgoing images 42.

It will be appreciated that block 206 is optional, for example, with the second example image sensing system 100 having the prism 162 to split incoming light into different colours, a light generator is not necessary. Each individual outgoing image 142 is captured with only a single colour of light, but each of the image sensors 140 captures different colours of light. The outgoing images 142, although projecting an identical view of the object 12, are each projecting different colours of the object 12.

Block 208 of the method 200 comprises identifying matched pixels of different outgoing images 42, 142 corresponding to a respective position on the object 12, and resolving the colour of the respective position of the object 12 based on the intensity readout of each matched pixel in the outgoing image 42, 142 and the colours of light that the respective matched pixels were exposed to while they were sensitive. The resolved colour will have a colour spectrum including the colours of light generated in block 206, or including the colours of light projected by a prism to the image sensors. As explained above, it may be possible to identify matched entire image lines 34, thereby reducing the processing required to resolve the colour of an entire image.

It will be appreciated that when the time delay of starting scanning of frames between image sensors is equal to 1/(number of image sensors), the time delay will be constant between different image sensors and over time, and the processing required to resolve the colour will be much lower, since it can be assumed that whole image lines on an image sensor will match other image lines on another image sensor, thus reducing the processing required to identify matched pixels to resolve the colour of an object being imaged.

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. For example, the processor and the controller may be integrated in the same unit. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless

The invention claimed is:

1. An image sensing system comprising:
at least two rolling shutter image sensors, each rolling shutter image sensor comprising an array of pixels in a frame arranged in a plurality of image lines extending along a width direction, and distributed in a scanning direction which is perpendicular to the width direction, wherein each rolling shutter image sensor is configured to scan its frame by sequentially scanning each image line along the scanning direction, wherein scanning each image line includes making the pixels in each image line sensitive to light for a predetermined exposure time, and then determining an intensity readout for each pixel of the respective image line;
a controller configured to temporally stagger scanning of frames for each rolling shutter image sensor, such that the controller is configured to start scanning of frames from a first image line in the scanning direction, for each rolling shutter image sensor with a time delay with respect to the other rolling shutter image sensors;
a lens system configured to project similar outgoing images of an object onto each rolling shutter image sensor, wherein the outgoing images are projected onto each rolling shutter image sensor such that each pixel of an outgoing image corresponding to a position on the object matches a pixel or group of pixels of another outgoing image corresponding to the respective position on the object, and such that the outgoing images are captured by each rolling shutter image sensor with differing colours of light, defined by different wavelengths; and
a processor configured to identify matched pixels of different outgoing images corresponding to a respective position on the object, and to resolve the colour of the object by superimposing colours from each matched pixel based on the intensity readout of each matched pixel and the colours of light that the respective matched pixels were exposed to while they were sensitive.

2. An image sensing system according to claim 1, wherein the lens system comprises a prism to split incoming light into two or more different colours of light, defined by different wavelengths, so as to project each outgoing image in a single colour, which differs from the colours of the other outgoing images, such that each rolling shutter image sensor captures an outgoing image with a different colour of light.

3. An image sensing system according to claim 1, comprising:
a light generator configured to generate at least two different colours of light, defined by different wavelengths, to illuminate the object; and
a timing module configured to control the light generator to sequentially generate the at least two different colours of light during scanning of each frame for each rolling shutter image sensor, so that each outgoing image is captured by each rolling shutter image sensor having two or more different colours.

4. An image sensing system according to claim 1, wherein each image line of an outgoing image on each rolling shutter image sensor matches an image line of another outgoing image of another rolling shutter image sensor corresponding to a position on the object, wherein the processor is configured to identify matched image lines, and resolve the colour of the respective position of the object based on the intensity readout of each pixel in the matched image lines and the colours of light that the respective pixels were exposed to while they were sensitive.

5. An image sensing system according to claim 1, wherein the matched pixels or the matched image lines are predetermined based on the configuration of the rolling shutter image sensors and the lens system.

6. An image sensing system according to claim 1, wherein a frequency of switching between light colours during scanning of a single frame is equal to, or a multiple of, the number of image sensors.

7. An image sensing system according to claim 1, wherein the number of colours of light which the light generator is configured to generate is equal to, or a multiple of, the number of rolling shutter images sensors.

8. An image sensing system according to claim 1, wherein the time delay between starting scanning of frames for each rolling shutter image sensor is equal to the time taken to scan a single frame divided by the number of rolling shutter image sensors.

9. A method of resolving the colour of an object with at least two rolling shutter image sensors, each rolling shutter image sensor comprising an array of pixels in a frame arranged into a plurality of image lines extending along a width direction, and distributed in a scanning direction which is perpendicular to the width direction, wherein each rolling shutter image sensor is configured to scan its frame by sequentially scanning each image line along the scanning direction, wherein scanning each image line includes making the pixels in each image line sensitive to light for a predetermined exposure time, and then determining an intensity readout for each pixel of the respective image line, the method comprising:
scanning frames of each rolling shutter image sensor in a staggered manner such that a start of scanning a frame for each rolling shutter image sensor is scanned with a time delay with respect to another rolling shutter image sensor;
projecting similar outgoing images onto each rolling shutter image sensor, wherein each pixel of an outgoing image corresponding to a position on the object matches a pixel or a group of pixels of another outgoing image corresponding to the respective position on the object, and such that the outgoing images are captured by each rolling shutter image sensor with differing colours of light, defined by different wavelengths;
identifying matched pixels of different outgoing images corresponding to a respective position on the object, and resolving the colour of the respective position of the object by superimposing colours from each matched pixel based on the intensity readout of each matched pixel in the outgoing image and the colours of light that the respective matched pixels were exposed to while they were sensitive.

10. A method according to claim 9, comprising:
splitting incoming light into two or more different colours of light defined by different wavelengths, so as to project each outgoing image in a single colour, which differs in colour from the other outgoing images, such that each rolling shutter image sensor captures an outgoing image with a different colour of light.

11. A method according to claim 9, comprising sequentially generating at least two different colours of light, defined by different wavelengths, to illuminate the object during scanning of each frame of the rolling shutter image sensors so that each outgoing image is captured by each rolling shutter image sensor having two or more different colours.

12. A method according to claim 9, wherein each image line of an outgoing image on each rolling shutter image sensor matches an image line of another outgoing image of another rolling shutter image sensor corresponding to a position on the object, the method comprising identifying matched image lines and resolving the colour of the respective position of the object based on the intensity readout of each pixel in the matched image lines and the colours of light that the respective pixels were exposed to while they were sensitive.

13. A method according to claim 9, wherein the at least two different colours of light are sequentially generated with a frequency equal to, or a multiple of, the number of image sensors during scanning of a single frame.

14. A method according to claim 9, wherein the number of colours of light which are generated is equal to, or a multiple of, the number of rolling shutter images sensors.

15. A method according to claim 9, wherein the time delay between starting scanning of frames for each rolling shutter image sensor is equal to the time taken to scan a single frame divided by the number of rolling shutter image sensors.

* * * * *